Feb. 19, 1946.                C. T. CORNING                 2,395,038
                          BATTERY CHARGING SYSTEM
                           Filed Dec. 5, 1942
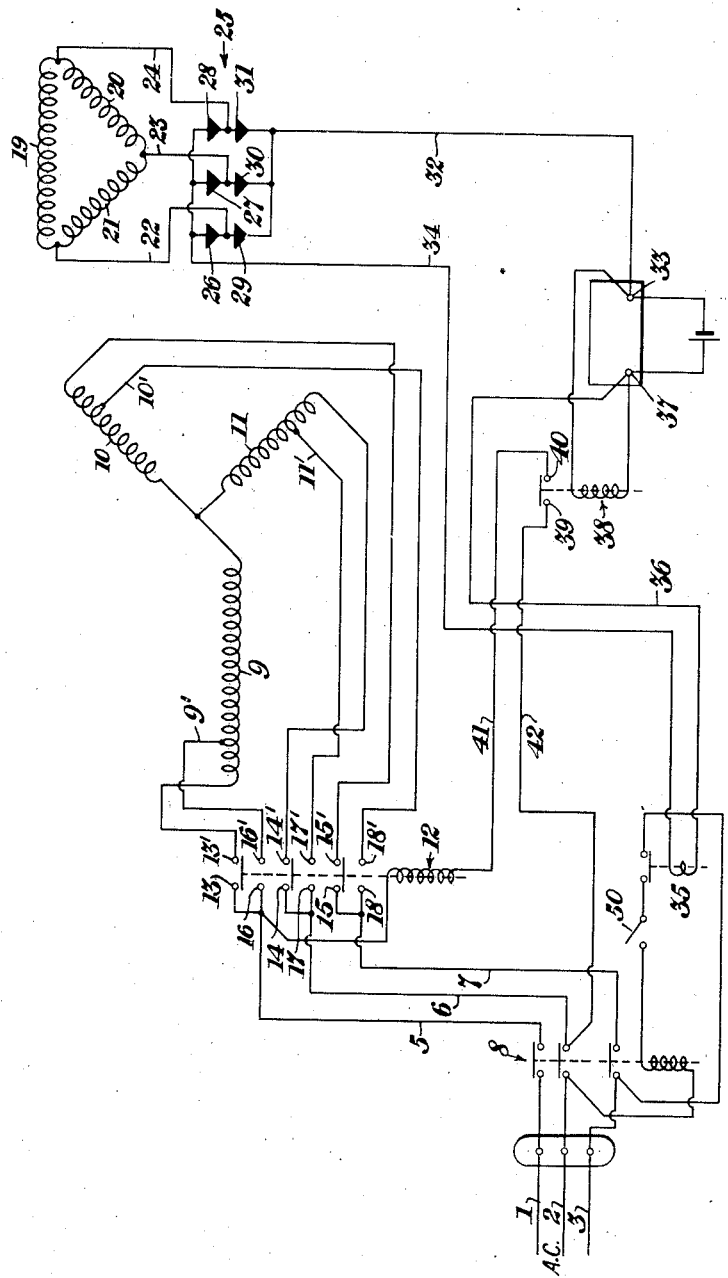
INVENTOR.
Charles T. Corning
BY
D. G. Angus
ATTORNEY Patented Feb. 19, 1946

2,395,038

UNITED STATES PATENT OFFICE 2,395,038

BATTERY CHARGING SYSTEM

Charles T. Corning, Fair Lawn, N. J., assignor to Federal Telephone & Radio Corporation, New York, N. Y., a corporation of Delaware Application December 5, 1942, Serial No. 467,975

2 Claims. (Cl. 320—39)

This invention relates to battery charging equipment and has for its object to enable batteries of different voltage to be charged at substantially the same charging current.

Storage batteries are ordinarily charged from an alternating current source of supply by means of rectifying equipment. The output of the charging equipment is usually designed to provide the desired charging rate of current for a battery of a predetermined voltage and if a battery of a different voltage is to be charged the equipment may be provided with adjusting means for manually adjusting the equipment to maintain substantially the same charging rate in spite of the difference in battery voltage.

In some instances it is desirable that the equipment shall provide substantially the same charging rate regardless of differences in the voltages of the batteries being charged, and without the necessity for manually adjusting or adapting the charging equipment to the different battery voltages. This is carried out according to the present invention by the provision of a voltage operated relay across the battery terminals adapted to respond differently to the batteries of different voltages. The operation of the relay is used to adjust the charging equipment in accordance with the battery voltage. The invention will be better understood from the following detailed description and the accompanying drawing which illustrates a battery charging equipment in accordance with this invention.

The equipment is shown operated from a 3-phase A. C. mains shown by wires 1, 2 and 3 connected to a terminal block 4 which is connected by wires 5, 6 and 7 through a relay-operated contactor 8 to the respective free ends of the star-connected primary windings 9, 10 and 11 of a power transformer. The relay-operated contactor or switch 8 is closed by closure of manually operated switch 50 which energizes the winding of relay 8 from main wires 2 and 3, to pull in the armature of the relay. Each primary winding is provided with a tap 9', 10' and 11' respectively. The connection from the mains to the star-connected primaries is made through the armature contacts of a relay 12 so that when the relay is de-energized the full primaries are connected in circuit over contacts 13—13', 14—14', and 15—15'. When the relay is energized its armature is pulled down and the only parts of the primary windings in circuit are those between the central star connection and the taps, these connections being made over the lower sets of contacts 16—16', 17—17' and 18—18'.

The secondary of the transformer is composed of three delta-connected secondary windings 19, 20 and 21, the output leads 22, 23, 24 from which are connected in a conventional manner to a bridge-connected rectifier 25. The individual rectifiers 26, 27, 28, 29, 30 and 31 of the bridge may be of the well-known selenium or copper oxide type. One of the D. C. output leads 32 of the rectifier is connected to the output terminal 33 and the other output lead 34 is connected through an overload relay winding 35 and then through lead 36 to the other output terminal 37. Relay 35 is a protective device which opens the circuit through the winding of relay 8 and consequently shuts off the power supply to the transformer when there is an overload through the battery.

There is connected across the battery charger output terminals 33 and 37 the winding of a voltage operated relay 38, the armature of which opens or closes the contacts 39 and 40 of a circuit comprising lead 41, the winding of relay 12, lead 5, main wire 1, main wire 2 and lead 42. Relay 38 is adjusted so that when a low voltage battery, for example a six volt battery, is connected across output terminals 33 and 37, the relay is insufficiently energized to pull in its armature; so contacts 39 and 40 are open and relay 12 consequently de-energized so that only the upper sets of contacts of relay 12 are in circuit. When a higher voltage battery, for example of twelve volts, is connected across output terminals 33 and 37, relay 38 is sufficiently energized to pull in its armature, closing contacts 39 and 40 and energizing relay 12. The armature of relay 12 is consequently pulled in to open its upper sets of contacts and close its lower sets of contacts, namely contacts 16, 16', 17, 17', and 18, 18'. This connects the A. C. power to the taps 9', 10' and 11' of the primary windings of the transformer, thereby raising the voltage at the secondaries and consequently across the battery. The taps are so placed in the primary windings that the rise in voltage at the secondary is about sufficient to compensate for the higher voltage battery so that the charging rate through the battery is about the same regardless of whether the lower voltage battery or the higher voltage battery is connected.

In the usual case, the two batteries of different voltage for which the charging rates will be maintained the same will ordinarily be six volt batteries and twelve volt batteries. In this case it will usually be convenient to adjust relay 38 to operate at about nine volts. It will be understood, however, that batteries of different voltages may thus be provided for and even three or more different voltages may be provided for. Where more than two different voltages are to be provided for, there can be connected across the D. C. output terminals a correspondingly increased number of voltage operated relays, each being connected to a relay such as 12 to connect with a different tap on the primary. If desired, the relay 12 could be made to operate on secondary taps instead of primary taps to compensate for the different battery voltages.

It will be understood that the invention is not limited to a three-phase system as illustrated but might be used with other kinds of supply lines.

It will be seen that by this invention there is provided a battery charging system which automatically accepts batteries of different voltages and provides them with substantially the same charging current independent of their voltages.

What is claimed is:

1. Battery charging apparatus comprising means for providing charging current including a source of direct current of two different voltages corresponding to the voltage ratings of two types of storage batteries having different numbers of cells, and output terminals for battery connections normally connected to the lower voltage from said source; and means for automatically connecting to said terminals the voltage from said source corresponding to the voltage rating of a battery of either type connected to the terminals, comprising a voltage responsive electromagnetic device energized by a minimum voltage between said voltage ratings, and switch means actuated by said device for connecting the higher voltage from said source to said terminals.

2. Battery charging apparatus as set forth in claim 1 in which the source of direct current comprises a source of alternating current, a transformer and a rectifier connected in series, and taps on the transformer arranged to provide said different voltages at the rectifier output; and in which the switch means comprises means for selectively connecting said taps in circuit between the source of alternating current and the rectifier.

CHARLES T. CORNING.